(12) United States Patent
Niitsuma et al.

(10) Patent No.: US 8,695,909 B2
(45) Date of Patent: Apr. 15, 2014

(54) FISHING REEL HANDLE ASSEMBLY

(75) Inventors: Akira Niitsuma, Osaka (JP); Hirotaka Nagashima, Osaka (JP)

(73) Assignee: Shimano Inc., Osaka (JP)

( * ) Notice: Subject to any disclaimer, the term of this patent is extended or adjusted under 35 U.S.C. 154(b) by 950 days.

(21) Appl. No.: 12/832,670

(22) Filed: Jul. 8, 2010

(65) Prior Publication Data

US 2011/0073696 A1 Mar. 31, 2011

(30) Foreign Application Priority Data

Sep. 30, 2009 (JP) .................................. 2009-226044

(51) Int. Cl.
  *A01K 89/01* (2006.01)
(52) U.S. Cl.
  USPC ............................. 242/283; 242/310; 242/311
(58) Field of Classification Search
  USPC ......... 242/311, 312, 282, 283, 284; D22/140, D22/141; 74/545–547
  See application file for complete search history.

(56) References Cited

U.S. PATENT DOCUMENTS

| | | | |
|---|---|---|---|
| 5,792,551 A * | 8/1998 | Miyao | 428/304.4 |
| 5,934,587 A | 8/1999 | Yamaguchi | |
| 6,790,535 B2 * | 9/2004 | Nishimura et al. | 428/457 |
| 2002/0150774 A1 * | 10/2002 | Nishimura et al. | 428/457 |
| 2003/0111569 A1 | 6/2003 | Hitomi | |
| 2010/0240477 A1 * | 9/2010 | Davis et al. | 473/560 |

FOREIGN PATENT DOCUMENTS

| | | |
|---|---|---|
| CN | 1735341 A | 2/2006 |
| CN | 1757284 B | 12/2010 |
| EP | 0 062 973 A2 | 10/1982 |
| JP | S29-11176 Y | 9/1954 |
| JP | S51-064790 U | 5/1976 |
| JP | S56-8180 U | 1/1981 |
| JP | 10-108596 | 4/1998 |
| JP | 2007-260357 A | 11/2007 |

OTHER PUBLICATIONS

Extended European Search Report of the corresponding European Application No. 10174438.1, dated Mar. 28, 2011.
Japanese Office Action of the corresponding Japanese Patent Application No. 2009-226044, dated Mar. 19, 2013.

* cited by examiner

*Primary Examiner* — Emmanuel M Marcelo
(74) *Attorney, Agent, or Firm* — Global IP Counselors

(57) ABSTRACT

A fishing reel handle assembly has a handle arm, a knob shaft, and a handle knob. The handle arm is relatively non-rotatably attached to a distal end of the handle shaft. The knob shaft is fixed to an end of the handle arm and extends in parallel to the handle shaft. The handle knob is supported by the knob shaft to be rotatable relative to the handle arm. The handle arm includes a main body and a convexo-concave portion. The main body extends substantially perpendicular to an axial direction of the handle shaft, and is formed by laminating sheets of prepreg. The convexo-concave portion is convexly or concavely formed on at least either a front surface of the main body or a back surface of the main body. The front surface allows the handle knob to be attached thereto, the back surface disposed opposite to the front surface.

20 Claims, 12 Drawing Sheets

FISHING REEL HANDLE ASSEMBLY

CROSS-REFERENCE TO RELATED APPLICATIONS

This application claims priority to Japanese Patent Application No. 2009-226044 filed on Sep. 30, 2009, the entirety of which is hereby incorporated by reference.

BACKGROUND

1. Field of the Invention

The present invention generally relates to a handle assembly, and more specifically, to a fishing-reel handle assembly attached to a distal end of a handle shaft while being prevented from rotating relative to the handle shaft.

2. Background Information

Fishing reels, e.g., the spinning reels and the dual bearing reels, generally include a handle assembly attached to a distal end of a handle shaft. The handle assembly includes a handle arm, a knob shaft, and a handle knob. The handle arm is attached to the distal end of the handle shaft while being prevented from rotating relative to the handle shaft. The knob shaft is fixed to a longitudinal end of the handle arm. The handle knob is rotatably attached to the knob shaft.

Japan Utility Model Application Publication No. JP-U-S51-64790 describes an example of a well-known handle arm having the aforementioned structure. Specifically, the handle arm is made of a light material (e.g., a synthetic resin) and includes a box buried therein. The box is herein formed by a metal plate having a high stiffness. In this case, the handle arm can be lightweight because it is made of a synthetic resin. Further, the handle arm includes the metal-plate box buried therein as an individual component separate from the handle arm. The handle arm can thereby maintain high strength.

The well-known handle arm is normally made of a light synthetic resin. However, it is also plausible to use a fiber-reinforced resin for forming a even more lightweight handle arm. When actually made of a fiber-reinforced resin, the handle arm may not ensure sufficient strength particularly in a lamination direction of plural fiber-reinforced resin layers. The handle arm may be thereby damaged when a large force acts on the handle arm in the axial direction of the handle shaft.

In response to the drawback, it is plausible to provide a handle arm made of a fiber-reinforced resin, having the structure of the well-known handle arm wherein the metal-plate box is buried in the handle arm as an individual component separate from the handle arm. In this case, it is required additionally to execute a processing step of burying the box in the handle arm. However, it is generally technically difficult to bury a metal component in a fiber-reinforced resin.

The present invention addresses a need for producing a fishing reel handle assembly for forming a lightweight handle arm and for maintaining high strength of the handle arm in the axial direction of a handle shaft. This invention addresses this need in the art as well as other needs, which will become apparent to those skilled in the art from this disclosure.

SUMMARY

A fishing reel handle assembly according to a first aspect is a handle assembly attached to a distal end of a handle shaft of a fishing reel in a non-rotatable state. The fishing reel handle assembly includes a handle arm, a knob shaft, and a handle knob. The handle arm is relatively non-rotatably attached to the distal end of the handle shaft. The handle arm includes a main body and a convexo-concave portion. The main body extends in a direction perpendicular or substantially perpendicular to an axial direction of the handle shaft. The main body is formed by laminating a plurality of sheets of prepreg. The convexo-concave portion is convexly or concavely formed on at least either a front surface of the main body or a back surface of the main body. The front surface allows the handle knob to be attached thereto, whereas the back surface is disposed opposite to the front surface. The knob shaft is fixed to an end of the handle arm while being disposed to extend in parallel to the handle shaft. The handle knob is supported by the knob shaft in a relatively rotatable state.

In the fishing reel handle assembly, the handle arm includes the main body and the convexo-concave portion. The main body extends in a direction intersecting with the axial direction of the handle shaft. The main body is formed by laminating the plurality of sheets of prepreg. The convexo-concave portion is convexly or concavely formed on either the front surface of the main body or the back surface of the main body, i.e., the surface opposite to the front surface. In this case, the handle arm can be lightweight due to the structure in which the main body of the handle arm is formed by laminating the plurality of sheets of prepreg. Further, a section strength modulus of the handle arm can be increased in a longitudinal direction of the handle arm and the handle assembly can thereby maintain high strength in the axial direction of the handle shaft due to the structure in which the convexo-concave portion is formed on either the front surface of the main body of the handle arm or the back surface of the main body of the handle arm, i.e., the surface opposite to the front surface. Consequently, the handle arm can be prevented from being broken and damaged even when a large force acts on the handle arm in the axial direction of the handle shaft. Further, a metal member is not required to be buried in the handle arm unlike the well-known handle arm assembly.

A fishing reel handle assembly according to a second aspect relates to the fishing reel handle assembly according to the first aspect, wherein the main body is formed by laminating the plurality of sheets of prepreg under a condition in which one or more of the plurality of sheets of prepreg has a fiber direction different from fiber directions of remaining sheets of prepreg excluding the foregoing one or more plurality of sheets of prepreg. In this case, the main body can further maintain high strength with respect to a load to be applied in a direction parallel to the fiber directions of the remaining sheets of prepreg, compared with a main body having a structure in which all the sheets of prepreg have an identical fiber direction, due to the structure in which the plurality of sheets of prepreg are laminated under a condition in which at least one of the plurality of sheets of prepreg has a fiber direction different from fiber directions of the remaining sheets of prepreg.

A fishing reel handle assembly according to a third aspect relates to the fishing reel handle assembly according to one of the first and second aspects, wherein the main body is formed by laminating the plurality of sheets of prepreg under a condition in which at least one of the plurality of sheets of prepreg has a fiber direction intersecting with a longitudinal direction of the main body in a non-perpendicular fashion. In this case, the handle assembly can maintain high strength with respect to force, i.e., a torsion load, acting on the handle arm in rotation of the handle due to the structure in which the plurality of sheets of prepreg are laminated under a condition in which at least one of the plurality of sheets of prepreg has a fiber direction intersecting with a longitudinal direction of the main body in a non-perpendicular fashion, i.e., "an X direction" intersecting with the longitudinal direction of the main body.

A fishing reel handle assembly according to a fourth aspect relates to the fishing reel handle assembly according to one of the second and third aspects, wherein at least one of the plurality of sheets of prepreg is a UD sheet having a single fiber direction. In general, the UD sheet has relatively low strength. In this case, however, the main body can maintain high strength in spite of use of the UD sheet, for instance, by laminating the plurality of sheets of prepreg under a condition in which at least a sheet of the UD sheet has a fiber direction different from fiber directions of the remaining sheets of the UD sheet, or alternatively by laminating the plurality of sheets of prepreg under a condition in which least a sheet of the UD sheet has a fiber direction identical to the X direction intersecting with the longitudinal direction of the main body.

A fishing reel handle assembly according to a fifth aspect relates to the fishing reel handle assembly according to one of the first to fourth aspects, wherein at least one of the plurality of sheets of prepreg is a cloth prepreg having two fiber directions perpendicular to each other. Further, the main body is formed by laminating the plurality of sheets of prepreg under a condition in which one of the fiber directions of the cloth prepreg is parallel to a longitudinal direction of the main body. In this case, the handle assembly can maintain even greater strength in the axial direction of the handle shaft due to the structure in which the plurality of sheets of prepreg are laminated under a condition in which one of the fiber directions of the cloth prepreg is parallel to the longitudinal direction of the main body.

A fishing reel handle assembly according to a sixth aspect relates to the fishing reel handle assembly according to one of the first to fifth aspects, wherein at least one of the plurality of sheets of prepreg is a cloth prepreg having two fiber directions perpendicular to each other. Further, the main body is formed by laminating the plurality of sheets of prepreg under a condition in which the cloth prepreg is positioned as an outermost surface of the main body. In this case, even if the handle assembly is cracked when dropped on the ground or crushed by things, the cracks can be prevented from expanding along the fiber directions of the main body due to the structure in which the main body is formed by laminating the plurality of sheets of prepreg under a condition in which the cloth prepreg, having two fiber directions perpendicular to each other, is positioned as an outermost surface of the main body.

A fishing reel handle assembly according to a seventh aspect relates to the fishing reel handle assembly according to one of the first to sixth aspects, wherein the convexo-concave portion is a convex portion convexly formed on a front surface of the main body. In this case, the convexo-concave portion is a convex portion formed on the front surface, i.e., the outer surface, of the main body. The structure prevents the fishing line from being easily tangled with the handle arm. Further, this structure prevents foreign substances, e.g., dust, sand, and salt, from easily accumulating on the front surface of the handle arm.

A fishing reel handle assembly according to an eighth aspect relates to the fishing reel handle assembly according to one of the first to seventh aspects, wherein the convexo-concave portion is a concave portion concavely formed on a back surface of the main body. In this case, the convexo-concave portion is a concave portion formed on the back surface, i.e., the inner surface, of the main body. In other words, the concave portion is not exposed to the outside. This structure prevents the fishing line from being easily tangled with the convexo-concave portion.

A fishing reel handle assembly according to a ninth aspect relates to the fishing reel handle assembly according to one of the first to eighth aspects, wherein the convexo-concave portion is formed in a shape roughly similar to an outline of the main body. In this case, the convexo-concave portion can be easily formed by, for instance, hot pressing of a plate-shape handle arm because the convexo-concave portion is formed in a shape roughly similar to the outline of the main body.

A fishing reel handle assembly according to a tenth aspect relates to the fishing reel handle assembly according to the ninth aspect, wherein the convexo-concave portion is formed by hot pressing. In this case, the convexo-concave portion can be easily formed.

A fishing reel handle assembly according to an eleventh aspect relates to the fishing reel handle assembly according to one of the first to tenth aspects, wherein the prepreg is carbon prepreg. In this case, the fishing reel handle assembly can be lightweight. Further, the fishing reel handle assembly can be made of carbon and this achieves a luxurious-looking design.

According to the fishing reel handle assembly, the handle arm includes the main body and the convexo-concave portion. The main body herein extends in a direction intersecting with the axial direction of the handle shaft. The main body is formed by laminating the plurality of sheets of prepreg. The convexo-concave portion is convexly or concavely formed on at least either of the front surface of the main body and the back surface of the main body, i.e., the surface opposite to the front surface. Therefore, the handle arm can be lightweight. Simultaneously, the handle arm can maintain high strength in the axial direction of the handle shaft.

These and other objects, features, aspects, and advantages will become apparent to those skilled in the art from the following detailed description, which, taken in conjunction with the annexed drawings, discloses exemplary embodiments.

BRIEF DESCRIPTION OF THE DRAWINGS

Referring now to the attached drawings which form a part of this original disclosure.

DETAILED DESCRIPTION OF THE EXEMPLARY EMBODIMENTS

Selected embodiments will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
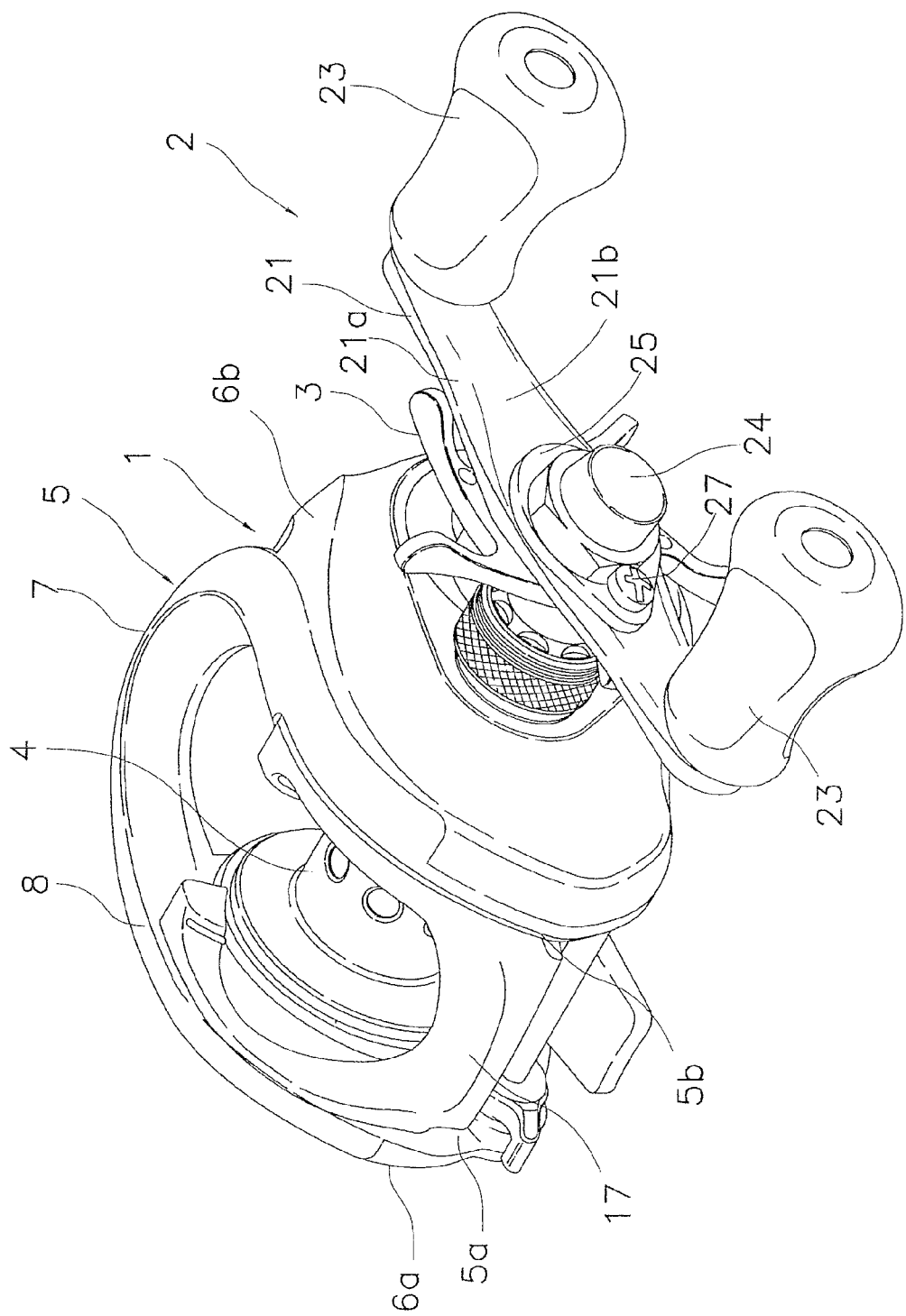
FIG. 1 is a perspective view of a dual-bearing reel according to an exemplary embodiment.
Figure 2:
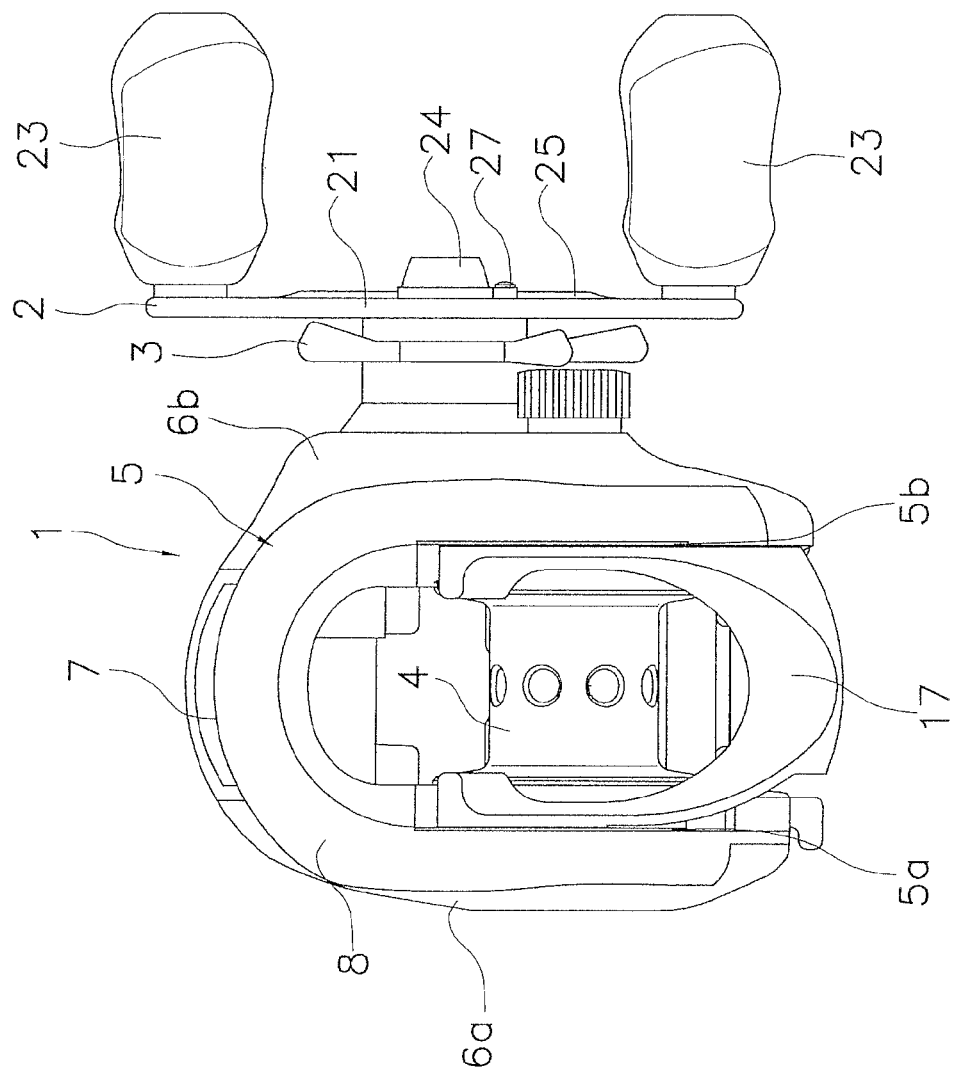
FIG. 2 is a top plan view of the dual-bearing reel.

FIGS. 1 and 2 illustrate a bait-casting reel as a dual-bearing reel according to an exemplary embodiment. The dual-bearing reel includes a reel unit 1, a handle assembly 2, and a spool 4. The handle assembly 2 is a component for rotating the spool 4. The handle assembly 2 is disposed lateral to the reel unit 1. The spool 4 is a component for winding a fishing line thereon. The spool 4 is detachably attached to the interior of the reel unit 1 in a rotatable state. Further, a star drag 3 is attached to the handle assembly 2 on the same side of the reel unit 1 to which the handle assembly 2 is attached. The star drag 3 is a component to regulate drag force.

The reel unit 1 includes a frame 5, a first side cover 6a, and a second side cover 6b. The first and second side covers 6a and 6b are attached to both lateral sides of the frame 5. Further, the reel unit 1 includes a front cover 7 and a thumb rest 8. The front cover 7 covers the front side of the frame 5, whereas the thumb rest 8 covers the top thereof. The frame 5 includes a pair of a first side plate 5a and a second side plate 5b, and plural coupling portions (not illustrated in the figure). The first and second side plates 5a and 5b are transversely opposed at a predetermined interval to be on axial opposite sides of the spool 4. The coupling portions couple the first side plate 5a and the second side plate 5b. The frame 5 is allowed to be attached to a fishing rod through a fishing rod attachment section (not illustrated in the figure) provided on a bottom coupling portion/portions.

The reel unit 1 houses the spool 4, a level winding mechanism (not illustrated in the figure), and a rotation transmission mechanism (not illustrated in the figure) in the interior thereof. The spool 4 is disposed under a condition in which the rotational axis thereof intersects with the fishing rod. The level winding mechanism is configured to wind uniformly a fishing line onto the spool 4. The rotation transmission mechanism is configured to transmit rotation of the handle assembly 2 to the spool 4. The rotation transmission mechanism includes a handle shaft 20, a clutch mechanism (not illustrated in the figure), and a drag mechanism (not illustrated in the figure). The handle shaft 20 allows the handle assembly 2 to be attached to the distal end thereof. The clutch mechanism is configured to allow or to prevent, i.e., switch between an on-state and an off-state of, rotational transmission from the handle assembly 2 to the spool 4. The handle shaft 20 is supported by the reel unit 1 in a rotatable state. Further, a clutch lever 17 is attached to the rear part of the frame 5 in a pivotable state. The clutch lever 17 is configured to switch between the on-state and the off-state of the clutch mechanism. The clutch lever 17 also serves as a pad for the thumb of an angler when he/she performs a thumbing operation.

As illustrated in FIGS. 3 to 7, the handle assembly 2 includes a handle arm 21, knob shafts 22, and handle knobs 23. The handle arm 21 is attached to the distal end of the handle shaft 20 while being prevented from rotating. The knob shafts 22 are fixed to both longitudinal ends of the handle arm 21. The handle knobs 23 are attached to the knob shafts 22, respectively, while being allowed to rotate but prevented from axially moving. The knob shafts 22 are fixed to the longitudinal ends of the handle arm 21, respectively, while being disposed to extend lengthwise in parallel to the handle shaft 20. The handle knobs 23 are supported by the knob shafts 22 in a rotatable state.

Figure 3:
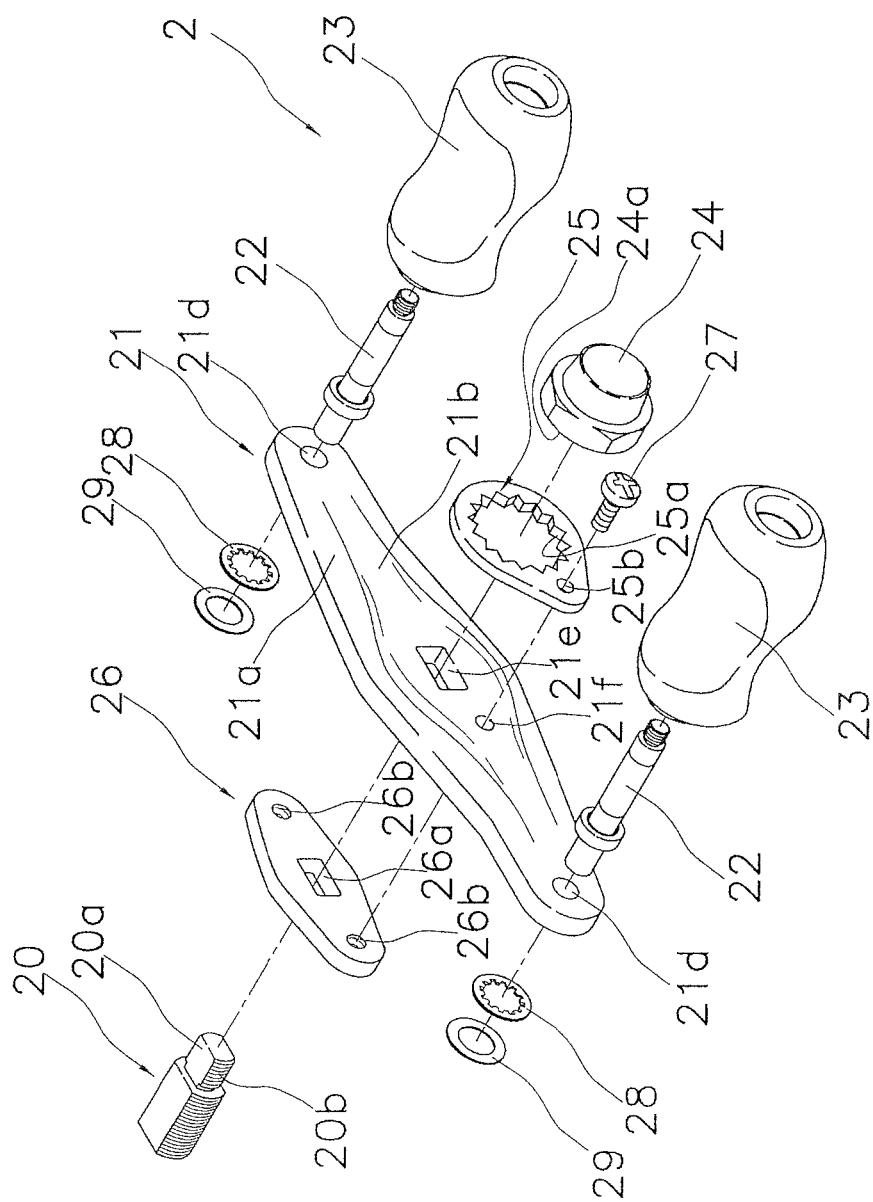
FIG. 3 is an exploded fragmentary perspective view of a handle assembly of the dual-bearing reel.
Figure 4:
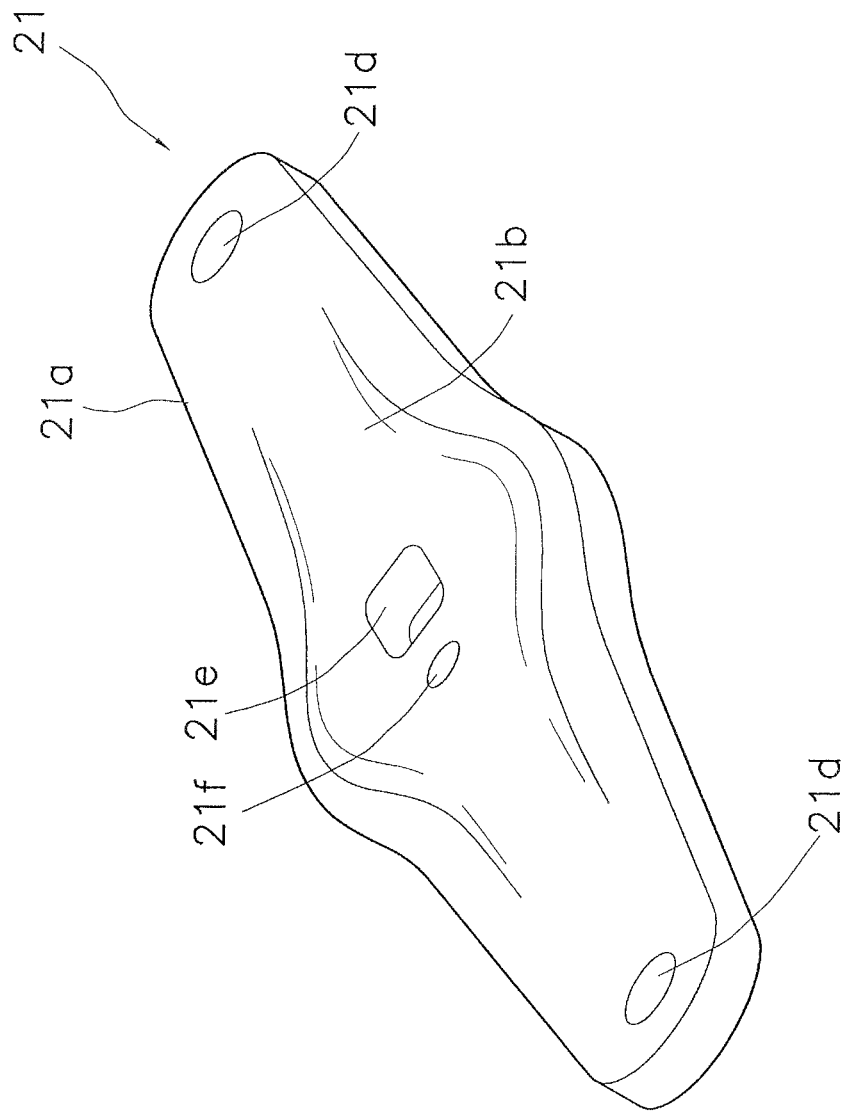
FIG. 4 is a perspective view of a handle arm of the handle assembly seen from the outside, i.e., a handle-knob attachment side.
Figure 5:
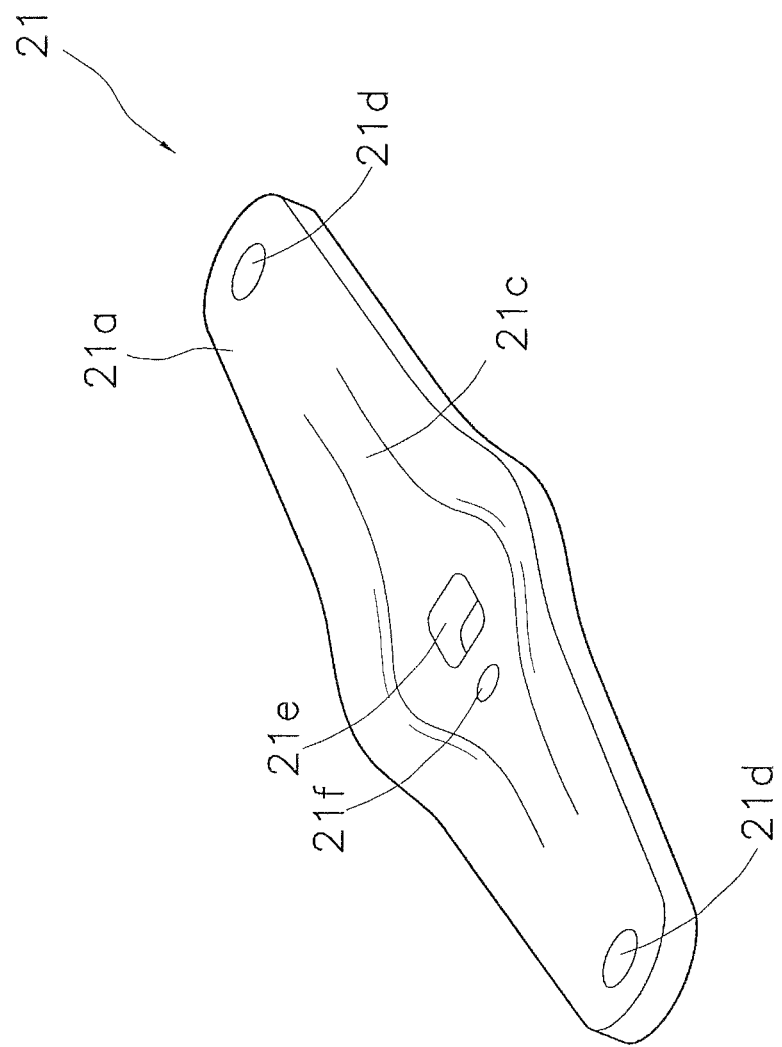
FIG. 5 is a perspective view of the handle arm seen from the inside, i.e., an opposite side to the handle-knob attachment side.
Figure 6:
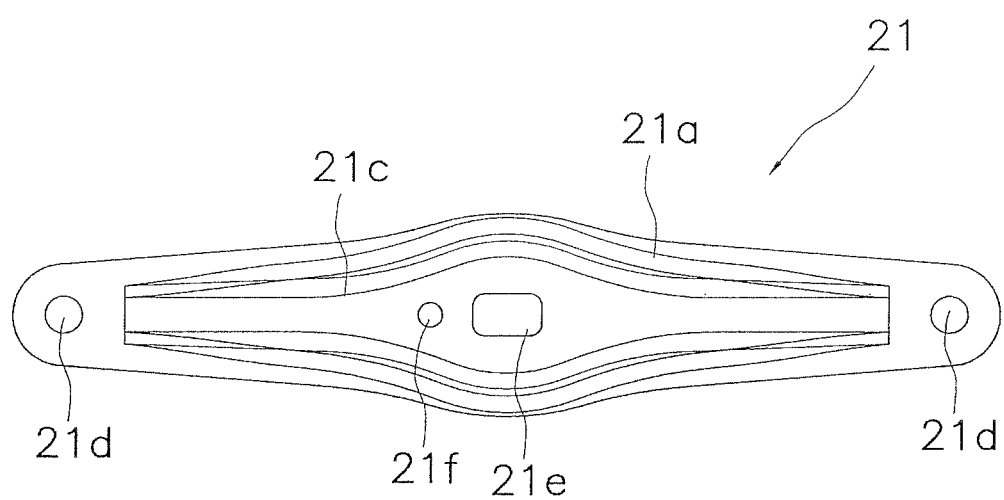
FIG. 6 is a plan view of an inner surface of the handle arm, i.e., the surface opposite to the handle-knob attachment side.

As illustrated in FIG. 3, the knob shafts 22 are inserted into through holes 21d formed in both longitudinal ends of the handle arm 21. Each of the knob shafts 22 is fixed to the corresponding through hole 21d by caulking while a toothed washer 28 and a washer 29 are attached to the distal end thereof. Both of the toothed washer 28 and the washer 29 are herein made of a stainless alloy. In this case, the inner diameter of each toothed washer 28 is designed to be roughly identical to or slightly less than the outer diameter of the distal end of the corresponding knob shaft 22. Therefore, each toothed washer 28 is attached to the corresponding knob shaft 22 while biting into the distal end of the corresponding knob shaft 22. Tight caulking fixation is thereby achieved for the knob shafts 22.

As illustrated in FIGS. 3 to 7, the handle arm 21 includes a non-circular hole 21e passing through the center part thereof. The non-circular hole 21 has a roughly rectangular inner shape or a rectangular inner shape with rounded corners, and thereby allows a pair of opposed chamfered portions 20a of the handle shaft 20 to be relatively non-rotatably engaged therewith. The handle shaft 20 includes a pair of opposed male threaded portions 20b on the outer periphery thereof. Each male threaded potion 20b connects an edge of one of the chamfered portions 20a and an edge of the other of the chamfered portions 20a. The pair of the male threaded portions 20b is partially exposed from the handle arm 21 to the outside when being inserted into the non-circular hole 21e. A female threaded portion 24a of a nut member 24 is firmly screwed onto the pair of the male threaded portions 20b to secure the handle arm 21 to the handle shaft 20. The nut member 24 is a hexagonal nut having a hexagonal outline. A retainer 25 is attached to the outer periphery of the nut member 24 for preventing rotation of the nut member 24 relative to the handle shaft 20. The retainer 25 includes an engaging hole 25a and a through hole 25b. The engaging hole 25a includes plural teeth to be engaged with the nut member 24 having a hexagonal outline. The nut member 24 is allowed to be engaged with the teeth in an any circumferential position relative to the engaging hole 25a while being prevented from relatively rotating with them. The through hole 25b is formed in the vicinity of the engaging hole 25a. The through hole 25 allows a bolt 27 to be inserted therein. The bolt 27 is herein screwed into a retainer fixation member 26 attached to the inner side of the handle arm 21 to attach the retainer 25 to the handle arm 21. The handle arm 21 further includes a through hole 21f. The through hole 21f is disposed in the vicinity of the non-circular hole 21e. The through hole 21f communicates with the through hole 25b of the retainer 25. The retainer fixation member 26 includes a non-circular hole 26a and screw holes 26b. The non-circular hole 26a is formed identical to the non-circular hole 21e of the handle arm 21. The non-circular hole 26a communicates with the non-circular hole 21e. The screw holes 26b are disposed in two positions closer to the non-circular hole 21e. Either of the screw holes 26b communicates with the through hole 21f of the handle arm 21 for allowing the bolt 27 to be screwed thereinto. Further, the screw holes 26b are symmetrically disposed with respect to the non-circular hole 26a. Therefore, the bolt 27 can be screwed into either of the screw holes 26b of the retainer fixation member 26 even if the retainer fixation member 26 is flipped or rotated at an angle of 180 degrees. In this case, the retainer 25 is fixed to the handle arm 21 by the bolt 27 screwed into the retainer fixation member 26. Therefore, it is possible to disperse a load to be applied in the fixation of the retainer 25, compared to a structure in which the retainer 25 is directly fixed to the handle arm 21.

Figure 9:
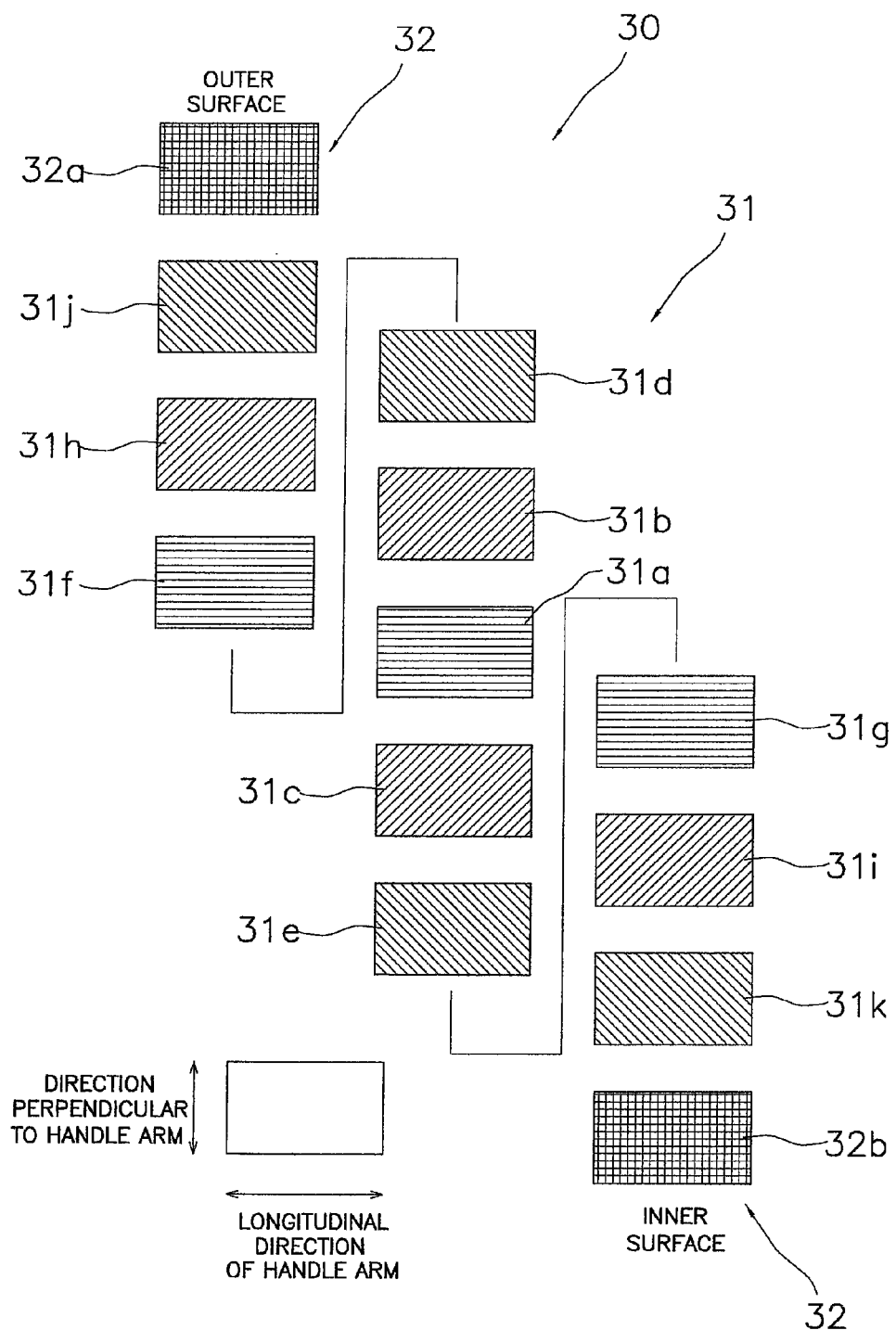
FIG. 9 is a view of a schematic diagram illustrating fiber directions of plural sheets of carbon prepreg to be laminated as the handle arm.

As illustrated in FIGS. 3 to 7, the handle arm 21 includes a main body 21a, a convex portion 21b, and a concave portion 21c. The main body 21a is attached to the distal end of the handle shaft 20 while being prevented from rotating relative to the handle shaft 20. The main body 21a extends in a direction intersecting with the axial direction of the handle shaft 20. In other words, the main body 21a perpendicularly or substantially perpendicularly extends lengthwise relative to the axial direction of the handle shaft 20. The main body 21a is formed by laminating plural sheets of carbon prepreg 30 (an example of a prepreg is shown in FIG. 9). The convex portion 21b (an example of a convexo-concave portion) is convexly formed on the front surface, i.e., the outer surface, of the main body 21a, i.e., the surface onto which the handle knobs 23 are attached. The concave portion 21c (an example of the convexo-concave portion) is concavely formed on the back surface, i.e., the inner surface, of the main body 21a, i.e., the surface opposite to the front surface to which the handle knobs 23 are attached. The convex portion 21b and the concave portion 21c are formed by hot pressing. The convex portion 21b and the concave portion 21c are respectively formed in a shape roughly similar to the outline of the main body 21a.

The main body 21a is formed by laminating plural sheets of the carbon prepreg 30 (see FIG. 9). In a laminated condition, a fiber direction of at least one of the plural sheets of the carbon prepreg 30 is different from fiber directions of the remaining sheets of the carbon prepreg 30. In addition, the main body 21a is formed by laminating the plural sheets of the carbon prepreg 30 under a condition in which a fiber direction of at least one of the plural sheets of the carbon prepreg 30 intersects with a longitudinal direction of the main body 21a in a non-perpendicular fashion. Further, the main body 21a is formed by laminating the plural sheets of the carbon prepreg 30 under a condition in which a fiber direction of at least one of the plural sheets of the carbon prepreg 30 is identical to an X direction intersecting with the longitudinal direction of the main body 21a. At least one of the plural sheets of the carbon prepreg 30 is a UD sheet 31 having a single fiber direction. Further, at least one of the plural sheets of the carbon prepreg 30 is a carbon cloth 32 (an example of cloth prepreg) having two fiber directions perpendicular to each other. The main body 21a is formed by laminating the plural sheets of the carbon prepreg 30 under a condition in which at least a sheet of the carbon cloth 32 is disposed as an outermost surface of the carbon prepreg 30. Further, the main body 21a is formed by laminating the plural sheets of the carbon prepreg 30 under a condition in which one of the fiber directions of the carbon cloth 32 is perpendicular to the longitudinal direction of the main body 21a. The main body 21a is also formed by laminating the plural sheets of the carbon prepreg 30 under a condition in which the other of the fiber directions of the carbon cloth 32 is directed along the longitudinal direction of the main body 21a.

As illustrated in FIG. 9, the plural sheets of the carbon prepreg 30 are specifically composed of eleven sheets of the UD sheet 31 and two sheets of the carbon cloth 32. Each UD sheet 31 has a single fiber direction, whereas each carbon cloth 32 has two fiber directions perpendicular to each other. Two sheets of the carbon cloth 32 are respectively laminated on the outer surface and the inner surface of the laminated UD sheets 31. As illustrated in FIG. 9, the eleven sheets of the UD sheet 31 are composed of first to eleventh UD sheets 31a-31k. Specifically, the first UD sheet 31a is disposed under a condition in which the fiber direction thereof is (linearly) parallel to the longitudinal direction of the handle arm 21. The second UD sheet 31b is laminated on the outer surface of the first UD sheet 31a under a condition that the fiber direction thereof forms an angle of 45 degrees with respect to the longitudinal direction of the handle arm 21 (the direction is hereinafter referred to as the X direction). The third UD sheet 31c is laminated on the inner surface of the first UD sheet 31a under a condition in which the fiber direction thereof (i.e., the X direction) forms an angle of 45 degrees with respect to the longitudinal direction of the handle arm 21. The fourth UD sheet 31d is laminated on the outer surface of the second UD sheet 31b under a condition that the fiber direction thereof forms an angle of −45 degrees with respect to the longitudinal direction of the handle arm 21 (the direction is also referred to as the X direction) or perpendicular to the fiber direction of the second and third UD sheets 31b and 31c. The fifth UD sheet 31e is disposed on the inner surface of the third UD sheet 31c under a condition that the fiber direction thereof (i.e., the X direction) forms an angle of −45 degrees with respect to the longitudinal direction of the handle arm 21 or parallel to the fourth UD sheet 31d. The sixth UD sheet 31f is laminated on the outer surface of the fourth UD sheet 31d under a condition in which the fiber direction thereof is (linearly) parallel to the longitudinal direction of the handle arm 21. The seventh UD sheet 31g is laminated on the inner surface of the fifth UD sheet 31e under a condition that the fiber direction thereof is (linearly) parallel to the longitudinal direction of the handle arm 21. The eighth UD sheet 31h is laminated on the outer surface of the sixth UD sheet 31f under a condition that the fiber direction thereof (i.e., the X direction) forms an angle of 45 degrees with respect to the longitudinal direction of the handle arm 21 parallel to the eighth UD sheet 31h. The ninth UD sheet 31i is laminated on the inner surface of the seventh UD sheet 31g under a condition that the fiber direction thereof (i.e., the X direction) forms an angle of 45 degrees with respect to the longitudinal direction of the handle arm 21. The tenth UD sheet 31j is laminated on the outer surface of the eighth UD sheet 31h under a condition that the fiber direction thereof (i.e., the X direction) forms an angle of −45 degrees with respect to the longitudinal direction of the handle arm 21 parallel to the fourth UD sheet 31d. The eleventh UD sheet 31k is disposed on the inner surface of the ninth UD sheet 31i under a condition that the fiber direction thereof (i.e., the X direction) forms an angle of −45 degrees with respect to the longitudinal direction of the handle arm 21 parallel to the fourth UD sheet 31d. On the other hand, a sheet of 3K cloth, for instance, is used for each carbon cloth 32. As illustrated in FIG. 9, two sheets of the carbon cloth 32 are composed of a first carbon cloth 32a and a second carbon cloth 32b. The first carbon cloth 32a is laminated on the outer surface of the tenth UD sheet 31j under a condition that one of the fiber directions thereof is perpendicular to the longitudinal direction of the handle arm 21, i.e., the fiber directions thereof are in a crisscross arrangement. On the other hand, the second carbon cloth 32b is disposed on the inner surface of the eleventh UD sheet 31k under a condition that one of the fiber directions thereof is perpendicular to the longitudinal direction of the handle arm 21 (i.e., the fiber directions thereof are in a crisscross arrangement).

Figure 8:
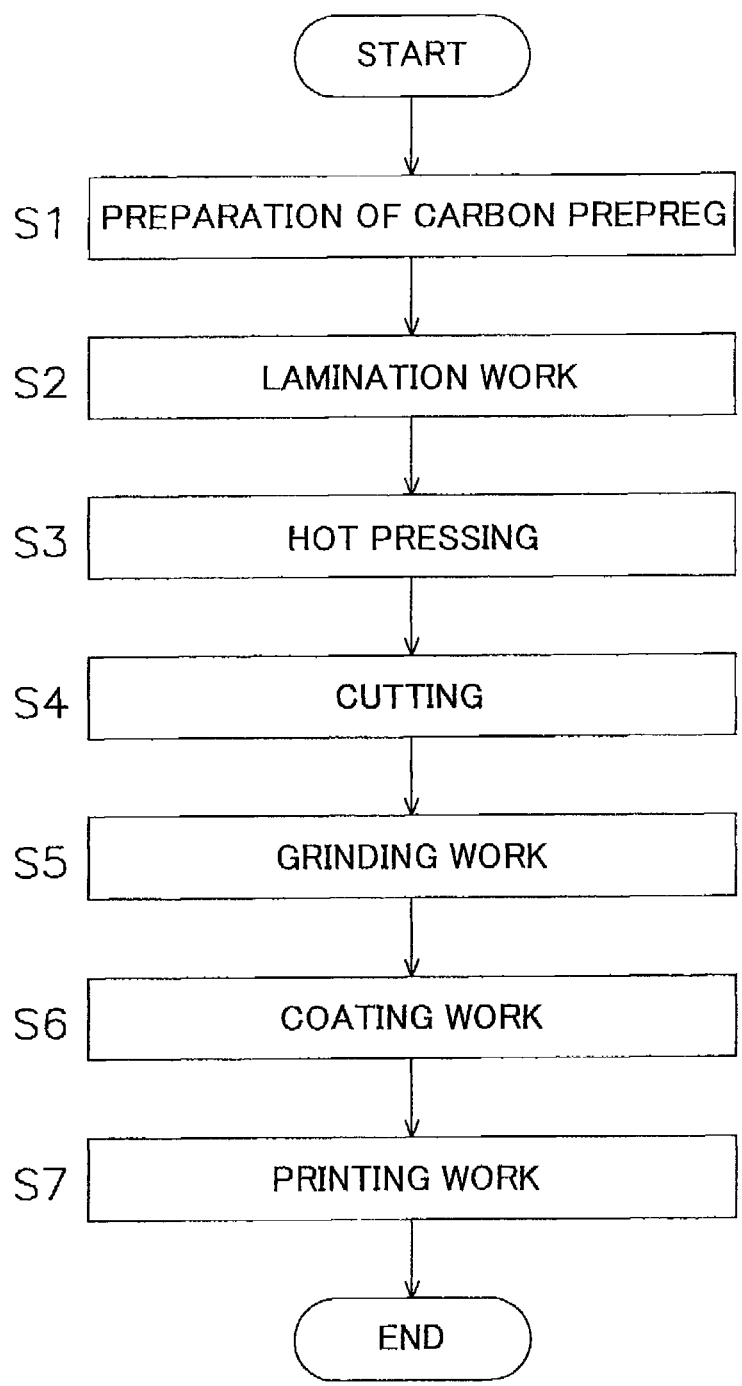
FIG. 8 is a view of a flowchart showing a series of steps for manufacturing the handle arm.

Next, a series of steps for manufacturing the handle arm 21 will be hereinafter explained with reference to the flowchart of FIG. 8.

Figure 10:
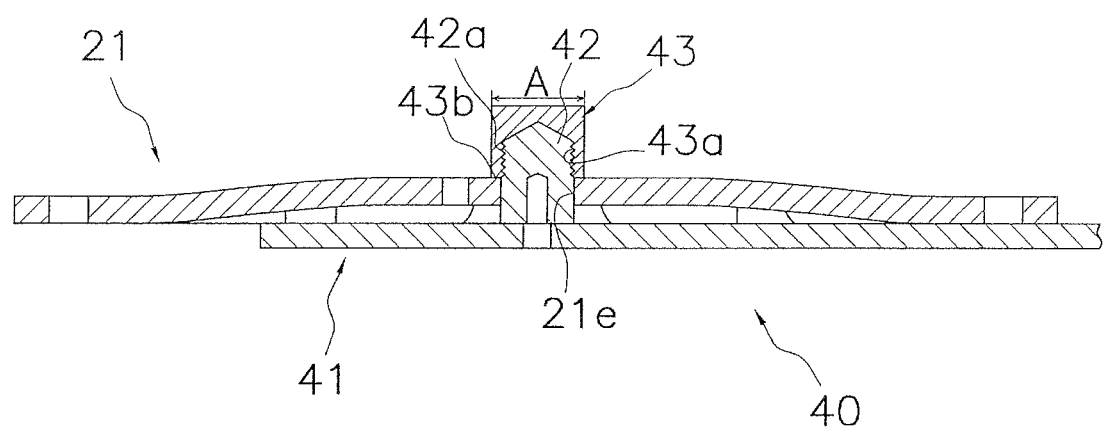
FIG. 10 is a view of a diagram comparable to FIG. 7, illustrating the handle arm attached to a masking tool in coating the handle arm.
Figure 11:
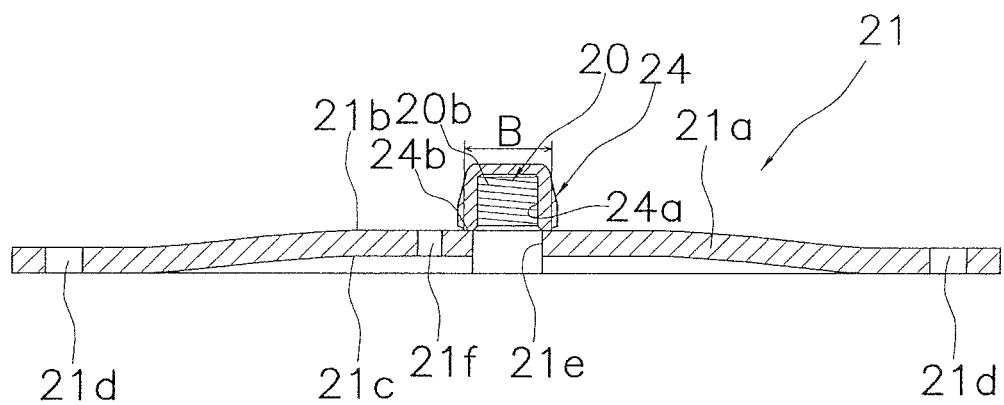
FIG. 11 is a view of a diagram comparable to FIG. 7, illustrating the handle arm having a nut member attached to a handle shaft.

In Step S1, a large sheet of the carbon prepreg 30 is firstly prepared as a base material for manufacturing plural sets of the handle arms 21. In Step S2, the eleven sheets 31a-31k of the UD sheet 31 and two sheets of the carbon cloth 32 are then laminated under a condition in which the fiber directions thereof are arranged as illustrated in FIG. 9. In Step S3, the plural sheets of the carbon prepreg 30 are integrated through hot pressing. Simultaneously, the convex portion 21b and the concave portion 21c are formed on the center part of each prospective handle arm 21. In Step S4, two through holes 21d, a non-circular hole 21e, and a through hole 21f are further formed in each prospective handle arm 21. Then, the integrated carbon prepreg 30 are cut out along the outer shapes of the plural prospective handle arms 21 through a cutting processing. In Step S5, a grinding work, e.g., buff grinding and barrel grinding, is executed for each cut-out handle arm 21. In Step S6, a coating work is further executed for each cut-out handle arm 21 by applying a glossy clear coating thereto. The coating work is herein executed under a condition in which each cut-out handle arm 21 is attached to a masking tool 40 illustrated in FIG. 10. The masking tool 40 is configured to mask the non-circular hole 21e of the handle arm 21. As illustrated in FIG. 10, the masking tool 40 includes a base portion 41, a protruding portion 42, and a cover portion 43. The base portion 41 is formed in a plate shape. The inner surface of the handle arm 21 is attached to the base portion 41. The protruding portion 42 upwardly protrudes from the base portion 41. The protruding portion 42 is inserted into the non-circular hole 21e of the handle arm 21 while the tip thereof is exposed from the handle arm 21 to the outside. The exposed tip of the protruding portion 42 includes a male threaded portion 42a. The cover member 43 includes a female threaded portion 43a on its inner periphery. The male threaded portion 42a of the protruding portion 42 is screwed into the female threaded portion 43a. The cover member 43 is attached to the masking tool 40 while covering the surrounding of the non-circular hole 21e. When the cover portion 43 is attached to the protruding portion 42, a contact portion 43b of the cover portion 43 makes contact with the handle arm 21. The contact portion 43b has an outer diameter A greater than the maximum inner diameter of the non-circular hole 21e. Further, referring to FIGS. 10 and 11, the outer diameter A of the contact portion 43b is designed to be greater than an outer diameter B of a contact portion 24b of the nut member 24. As illustrated in FIG. 11, the contact portion 24b of the nut member 24 makes contact with the handle arm 21 when the nut member 24 is attached to the male threaded portion 20b. Accordingly, it is possible to mask reliably a part of the outer surface of the handle arm 21, i.e., a part making contact with the contact portion 24b of the nut member 24, with the configuration that the outer diameter A of the contact portion 43b of the cover portion 43 is designed to be greater than the outer diameter B of the contact portion 24b of the nut member 24. Consequently, a coating material is blocked from being applied onto the part of the outer surface of the handle arm 21. In other words, even if the nut member 24 is tightly fastened and accordingly strongly press-contacted with the coated carbon handle arm 21, removal of the coating material is not caused in the press-contacted part because the coating material is not applied onto the part of the outer surface of the handle arm 21, i.e., the part making contact with the contact portion 24b of the nut member 24. Finally, referring again to FIG. 8, in Step S7, a printing work is executed for printing characters, e.g., a reel model number and a manufacturer name, on the handle arm 21.

Figure 7:
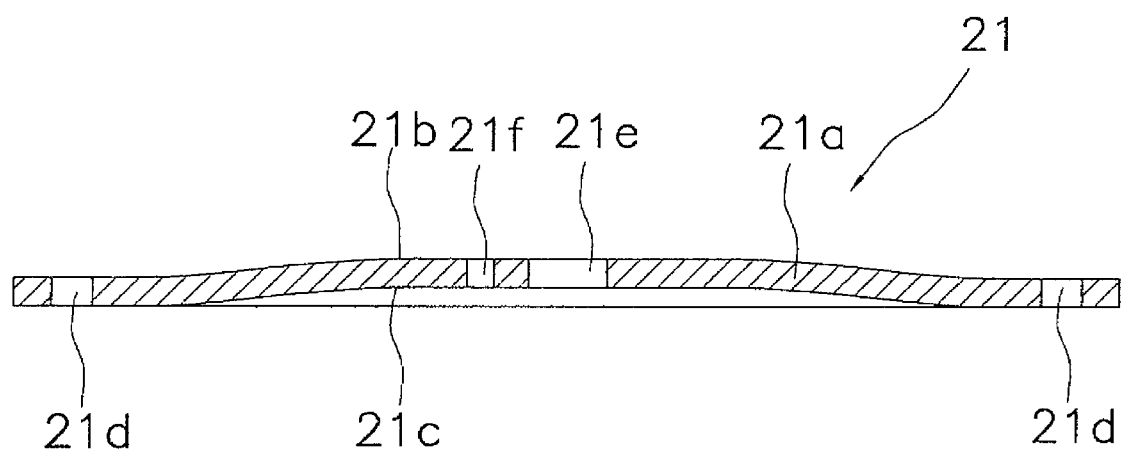
FIG. 7 is a cross-sectional side view of the handle arm.

In conclusion, referring to FIGS. 3 and 7, the handle arm 21 of the handle assembly 2 of the present exemplary embodiment includes the main body 21a, the convex portion 21b, and the concave portion 21c. The main body 21a is formed by laminating the plural sheets of the carbon prepreg 30 in a direction intersecting with the handle shaft 20. The convex portion 21b is convexly formed on the front surface, i.e., the outer surface, of the main body 21a, i.e., the surface to which the handle knobs 23 are attached. On the other hand, the concave portion 21c is concavely formed on the back surface, i.e., the inner surface, of the main body 21a, i.e., the surface opposite to the front surface to which the handle knobs 23 are attached. According to the handle assembly 2 of the present exemplary embodiment, the main body 21a of the handle arm 21 is formed by laminating the plural sheets of the carbon prepreg 30. Therefore, the handle arm 21 can be lightweight. Further, the convex portion 21b is formed on the front surface, i.e., the outer surface, of the main body 21a of the handle arm 21, whereas the concave portion 21c is formed on the back surface (i.e., the inner surface) of the main body 21a of the handle arm 21. A section strength modulus of the handle arm 21 can be thereby increased in the longitudinal direction thereof. In other words, the handle shaft 20 can maintain high strength in the axial direction of the handle shaft 20, i.e., the direction perpendicular to the length of handle arm 21. Consequently, the handle arm 21 can be prevented from being broken and damaged even if a large force acts on the handle arm 21 in the axial direction of the handle shaft 20. Further, a metal member is not required to be buried into the handle arm 21 unlike the well-known handle arms. Therefore, the handle arm 21 can be made of carbon and this achieves a luxurious-looking design for the handle arm 21.

Other Exemplary Embodiments

Other embodiments will now be explained. In view of the similarity between the first and alternate embodiments, the parts of the other embodiments that are identical to the parts of the first embodiment will be given the same reference numerals as the parts of the first embodiment. Moreover, the descriptions of the parts of the other embodiments that are identical to the parts of the first embodiment may be omitted for the sake of brevity.

(a) The aforementioned exemplary embodiment has exemplified the handle assembly 2 for a dual-bearing reel. However, application of the present invention is not limited to this. For example, the present invention can be applied to the handle assembly 2 for a spinning reel. Further, the aforementioned exemplary embodiment has exemplified the handle assembly 2 of a double-handle type having two handle knobs 23. However, the handle assembly 2 may be of a single-handle type having only one handle knob 23.

(b) The aforementioned exemplary embodiment has exemplified the structure that the convex portion 21b and the concave portion 21c are formed on both sides of the handle arm 21 as the convexo-concave portions. However, either the convex portion 21b or the concave portion 21c may be formed on only one side of the handle arm 21. Further, the aforementioned exemplary embodiment has exemplified a structure in which the convex portion 21b is formed on the outer surface of the handle arm 21 whereas the concave portion 21c is formed on the inner surface of the handle arm 21. However, the concave portion 21c may be formed on the outer surface of the handle arm 21, whereas the convex portion 21b may be formed on the inner surface of the handle arm 21.

(c) In the aforementioned exemplary embodiment, the plural sheets of the carbon prepreg 30 are laminated by hot pressing. However, a lamination method is not necessarily limited to this. Further, configurations of the carbon prepreg 30 are not necessarily limited to those in the aforementioned exemplary embodiment, including e.g., types of the carbon prepreg 30, the number of laminated sheets of the carbon prepreg 30, and the fiber directions of the sheets of the carbon prepreg 30.

Figure 12:
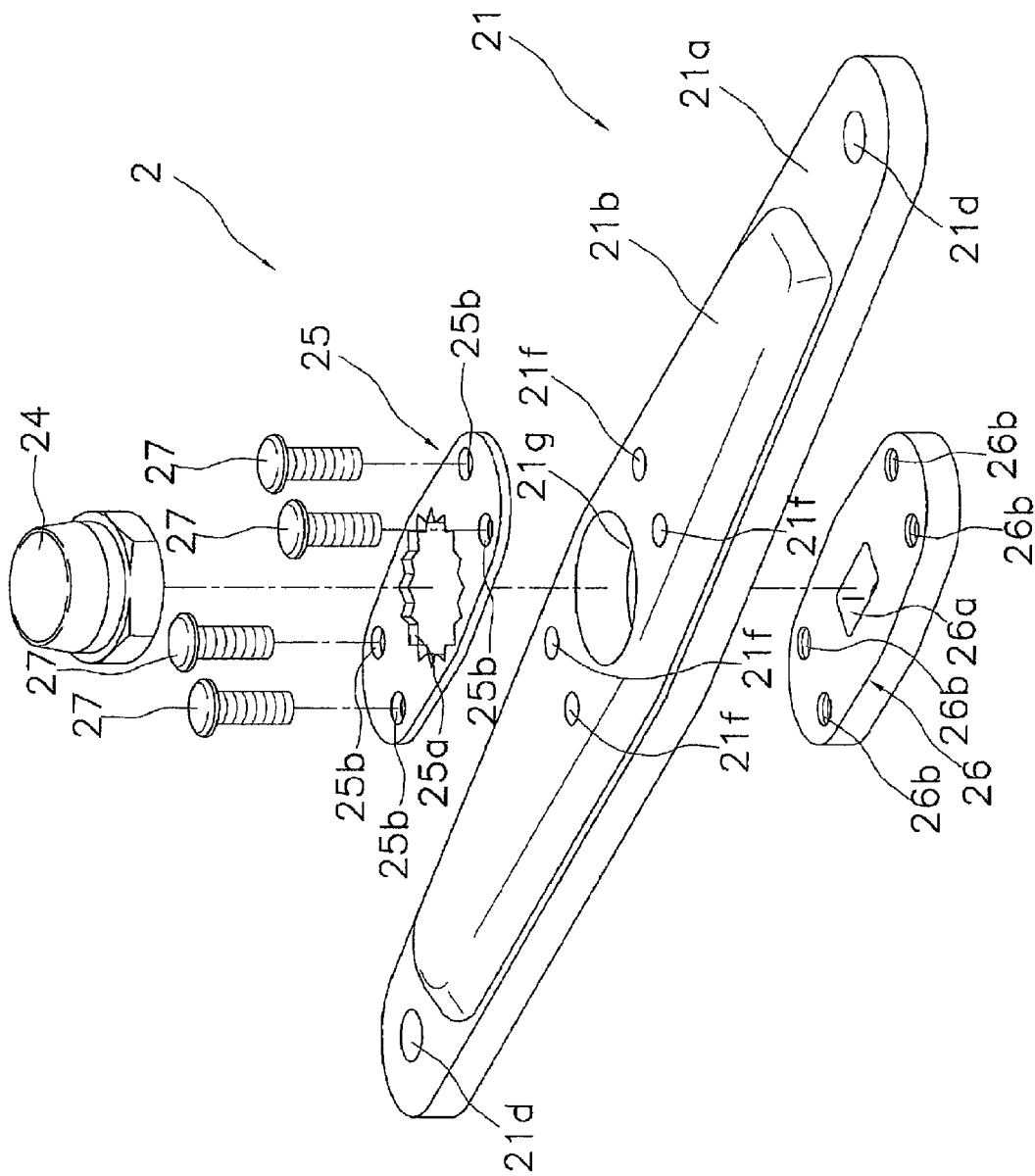
FIG. 12 is a view of a diagram comparable to FIG. 3, illustrating an exploded fragmentary perspective view of a handle assembly of a dual-bearing reel according to one of the other exemplary embodiments.

(d) In the aforementioned exemplary embodiment, the pair of the chamfered portions 20a of the handle shaft 20 is engaged with both of the non-circular hole 21e of the handle arm 21 and the non-circular hole 26a of the retainer fixation member 26. As illustrated in FIG. 12, however, the pair of the chamfered portions 20a of the handle shaft 20 may be engaged only with the non-circular hole 26a of the retainer fixation member 26. In this case, the handle arm 21 includes a circular hole 21g in the center part thereof, instead of the non-circular hole 21e of the aforementioned exemplary embodiment. The circular hole 21g has a diameter greater than the outer diameter of the pair of the chamfered portions 20a of the handle shaft 20. Further, the handle arm 21 is interposed and fixed between the retainer 25 and the retainer fixation member 26 under a condition in which four bolts 27 are screwed into the retainer fixation member 26 through the retainer 25. In this case, the pair of the chamfered portions 20a of the handle shaft 20 is engaged only with the non-circular hole 26a of the retainer fixation member 26. Therefore, the well-known reels are allowed to exchange the handle arm 21 having the non-circular hole 21e with the handle arm 21 of the present exemplary embodiment without any design changes of the well-known reels by designing the diameter of the circular hole 21g of the handle arm 21 of the present exemplary embodiment to be greater than the diameter of the non-circular hole 21e of the well-known reels.

(e) In the aforementioned exemplary embodiment, the carbon prepreg 30 is used as an example of prepreg. However, prepreg is not limited to this. For example, prepreg of other types such as glass prepreg and fiber prepreg may be used.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of a fishing reel. Accordingly, these terms, as utilized to describe the present invention should be interpreted relative to a fishing reel having a fishing reel handle assembly as normally used. Finally, terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A fishing reel handle assembly attached to a distal end of a handle shaft of a fishing reel in a non-rotatable state, comprising:
    a handle arm relatively non-rotatably attached to the distal end of the handle shaft;
    a knob shaft fixed to an end of the handle arm, the knob shaft disposed to extend in parallel to the handle shaft; and
    a handle knob supported by the knob shaft to be rotatable relative to the handle arm, the handle arm including
        a main body extending substantially perpendicular to an axial direction of the handle shaft, the main body formed by laminating a plurality of sheets of prepreg, and
        a convexo-concave portion convexly or concavely formed on at least either a front surface of the main body or a back surface of the main body, the back surface disposed opposite to the front surface, the handle knob being attached to the front surface.

2. The fishing reel handle assembly according to claim 1, wherein
    the main body is formed by laminating the plurality of sheets of prepreg under a condition in which at least one of the plurality of sheets of prepreg has a fiber direction different from fiber directions of remaining sheets of prepreg.

3. The fishing reel handle assembly according to claim 2, wherein
    at least the one of the plurality of sheets of prepreg is a UD (Unidirectional) sheet having a single fiber direction.

4. The fishing reel handle assembly according to claim 1, wherein
    the main body is formed by laminating the plurality of sheets of prepreg under a condition in which at least one of the plurality of sheets of prepreg has a fiber direction intersecting with a longitudinal direction of the main body in a non-perpendicular fashion.

5. The fishing reel handle assembly according to claim 1, wherein
    at least one of the plurality of sheets of prepreg is a cloth prepreg having two fiber directions perpendicular to each other, and
    the main body is formed by laminating the plurality of sheets of prepreg under a condition in which one of the fiber directions of the cloth prepreg is parallel to a longitudinal direction of the main body.

6. The fishing reel handle assembly according to claim 1, wherein
    at least one of the plurality of sheets of prepreg is a cloth prepreg having two fiber directions perpendicular to each other, and
    the main body is formed by laminating the plurality of sheets of prepreg under a condition such that the cloth prepreg is positioned as an outermost surface of the main body.

7. The fishing reel handle assembly according to claim 1, wherein
    the convexo-concave portion is a convex portion convexly formed on the front surface of the main body.

8. The fishing reel handle assembly according to claim 1, wherein
    the convexo-concave portion is the concave portion concavely formed on a back surface of the main body.

9. The fishing reel handle assembly according to claim 1, wherein
the convexo-concave portion is formed in a shape similar an outline of the main body.

10. The fishing reel handle assembly according to claim 9, wherein the convexo-concave portion is formed by hot pressing.

11. The fishing reel handle assembly according to claim 1, wherein the prepreg is carbon prepreg.

12. The fishing reel according to claim 1, wherein
the convexo-concave portion is formed in a shape roughly similar to an outline of the main body.

13. A fishing reel comprising:
a handle shaft having proximal and distal ends; and
a fishing reel handle assembly attached to the distal end of the handle shaft of a fishing reel in a non-rotatable state, the fishing reel handle assembly having
a handle arm relatively non-rotatably attached to the distal end of the handle shaft,
a knob shaft fixed to an end of the handle arm, the knob shaft disposed to extend in parallel to the handle shaft, and
a handle knob supported by the knob shaft to be rotatable relative to the handle arm,
the handle arm including
a main body extending substantially perpendicular to an axial direction of the handle shaft, the main body formed by laminating a plurality of sheets of prepreg, and
a convexo-concave portion convexly or concavely formed on at least either a front surface of the main body or a back surface of the main body, the back surface disposed opposite to the front surface, the handle knob being attached to the front surface.

14. The fishing reel according to claim 13, wherein
the main body is formed by laminating the plurality of sheets of prepreg under a condition in which at least one of the plurality of sheets of prepreg has a fiber direction different from fiber directions of remaining sheets of prepreg.

15. The fishing reel according to claim 14, wherein
at least the one of the plurality of sheets of prepreg is a UD (Unidirectional) sheet having a single fiber direction.

16. The fishing reel according to claim 13, wherein
the main body is formed by laminating the plurality of sheets of prepreg under a condition in which at least one of the plurality of sheets of prepreg has a fiber direction intersecting with a longitudinal direction of the main body in a non-perpendicular fashion.

17. The fishing reel according to claim 13, wherein
at least one of the plurality of sheets of prepreg is a cloth prepreg having two fiber directions perpendicular to each other, and
the main body is formed by laminating the plurality of sheets of prepreg under a condition in which one of the fiber directions of the cloth prepreg is parallel to a longitudinal direction of the main body.

18. The fishing reel according to claim 13, wherein
at least one of the plurality of sheets of prepreg is a cloth prepreg having two fiber directions perpendicular to each other, and
the main body is formed by laminating the plurality of sheets of prepreg under a condition such that the cloth prepreg is positioned as an outermost surface of the main body.

19. The fishing reel according to claim 13, wherein
the convexo-concave portion is a convex portion convexly formed on front surface of the main body.

20. The fishing reel according to claim 13, wherein
the convexo-concave portion is a concave portion concavely formed on the back surface of the main body.

* * * * *